United States Patent
Hattori et al.

(10) Patent No.: US 8,073,619 B2
(45) Date of Patent: Dec. 6, 2011

(54) POSITION CORRECTION APPARATUS

(75) Inventors: Yousuke Hattori, Ama-gun (JP); Minoru Okada, Gifu (JP); Masahiro Goto, Kariya (JP); Hiroshi Inou, Kariya (JP); Yoshifumi Kato, Nishikamo-gun (JP)

(73) Assignee: Denso Corporation, Kariya (JP)

( * ) Notice: Subject to any disclaimer, the term of this patent is extended or adjusted under 35 U.S.C. 154(b) by 710 days.

(21) Appl. No.: 12/221,673

(22) Filed: Aug. 4, 2008

(65) Prior Publication Data

US 2009/0043495 A1    Feb. 12, 2009

(30) Foreign Application Priority Data

Aug. 7, 2007  (JP) ................ 2007-205487

(51) Int. Cl.
G01C 21/28   (2006.01)
G01C 21/30   (2006.01)

(52) U.S. Cl. .................. 701/210; 701/208; 340/995.14

(58) Field of Classification Search .......... 340/990, 340/995.12, 995.14, 995.22, 998; 342/357.31; 701/200–201, 207–210, 213–214, 217, 221
See application file for complete search history.

(56) References Cited

U.S. PATENT DOCUMENTS

| | | | |
|---|---|---|---|
| 5,272,483 A | 12/1993 | Kato | |
| 5,416,477 A | 5/1995 | Shibata | |
| 5,990,825 A | 11/1999 | Ito | |
| 6,023,653 A * | 2/2000 | Ichimura et al. | 701/208 |
| 6,480,784 B2 * | 11/2002 | Mizuno | 701/207 |
| 6,502,033 B1 | 12/2002 | Phuyal | |
| 6,581,005 B2 * | 6/2003 | Watanabe et al. | 701/210 |
| 6,597,987 B1 * | 7/2003 | Barton | 701/213 |
| 6,615,135 B2 * | 9/2003 | Davies | 701/213 |
| 7,809,500 B2 * | 10/2010 | Couckuyt et al. | 701/207 |
| 2005/0131635 A1 * | 6/2005 | Myllymaki et al. | 701/205 |

FOREIGN PATENT DOCUMENTS

| | | |
|---|---|---|
| EP | 0 522 862 | 9/1995 |
| JP | 01-109276 | 4/1989 |
| JP | 02-187899 | 7/1990 |
| JP | B2-2734195 | 6/1992 |
| JP | 06-004024 | 1/1994 |
| JP | 10-048320 | 2/1998 |
| JP | 10-185600 | 7/1998 |
| JP | 2002-040128 | 2/2002 |
| JP | 2004-295165 | 10/2004 |

OTHER PUBLICATIONS

Office action dated Aug. 18, 2009 in corresponding Japanese Application No. 2007-205487. Office action dated Sep. 14, 2010 in corresponding Chinese Application No. 2008 10131265.X.
Search Report dated Nov. 4, 2010 in corresponding European Application No. 08012334.2.

* cited by examiner

*Primary Examiner* — Gerald J. O'Connor
*Assistant Examiner* — Mark Holcomb
(74) *Attorney, Agent, or Firm* — Harness, Dickey & Pierce, PLC

(57) ABSTRACT

An apparatus corrects a position coordinate measured by a GPS receiver. Road data representing a position coordinate of a constructed road is included. Locus data representing a plurality of position coordinates of the GPS receiver during a past specified period is generated based on a position coordinate acquired. A road section traveled by the GPS receiver during the past specified period is estimated based on road data stored and a position coordinate acquired. A bias error of a position coordinate measured by the GPS receiver is estimated based on position coordinates at a plurality of points in a road section estimated and position coordinates at a plurality of points represented by the locus data. A position coordinate measured by the GPS receiver is corrected based on a bias error estimated and outputted.

12 Claims, 8 Drawing Sheets

(COEFFICIENT SETTING MAP)

| ACCURACY ($\varepsilon p$, $\varepsilon v$) | COEFFICIENTS (A1, A2, A3) |
|---|---|
| ... | ... |
| ... | ... |
| ... | ... |
| ... | ... |

- ROAD
- CENTER
- GPS
- CORRECTED
- TRUE LOCUS (MAP MATCHING)

- ROAD
- CENTER
- GPS
- CORRECTED
- TRUE LOCUS

POSITION CORRECTION APPARATUS

CROSS REFERENCE TO RELATED APPLICATION

This application is based on and incorporates herein by reference Japanese Patent Application No. 2007-205487 filed on Aug. 7, 2007.

FIELD OF THE INVENTION

The present invention relates to a position correction apparatus.

BACKGROUND OF THE INVENTION

Conventionally, it is known that a positioning result from the GPS (Global Positioning System) positioning contains a bias error due to propagation delay, a positioning error due to multi-path, and the other random errors due to various factors.

The bias error occurs mainly due to a propagation delay when a GPS signal passes through an ionization layer between a GPS satellite and the earth. The bias error always occurs because the ionization layer mainly causes it. The degree of errors varies with ionization layer states every moment.

A conventional apparatus such as a car navigation system receives information about a bias error from an FM broadcast station (so-called DGPS station) in the form of broadcast waves. The apparatus corrects a position coordinate measured by a GPS receiver in accordance with the received bias error information (e.g., see Patent Document 1).

Patent Document 1: H10-2002-185600 A

However, the FM receiver needs to be mounted on the apparatus for the method that receives the bias error information from the FM broadcast station and corrects the position coordinate measured by the GPS receiver. Accordingly, the product cost increases.

When a measuring point is distant from an FM broadcast station, that method causes a difference between a bias error at the measuring point and that in the FM broadcast station due to surrounding environment differences. Even though receiving the bias error information from the FM broadcast station, a reception destination apparatus (navigation system) cannot accurately remove the bias error from the positioning result from the GPS receiver. The apparatus cannot accurately detect the position coordinate for the current position. Further, the conventional method corrects a positioning result from the GPS receiver based on less accurate bias error information received from the FM broadcast station. The positioning accuracy may be degraded.

SUMMARY OF THE INVENTION

The present invention has been made in consideration of the foregoing. It is therefore an object of the present invention to provide a position correction apparatus capable of removing a bias error from a positioning result from a GPS receiver.

According to an example of the present invention, a position correction apparatus is provided as follows. A position information acquisition means is configured to acquire a position coordinate measured by a GPS (Global Positioning System) receiver. A road data storage means is configured to store road data indicating a position coordinate of a constructed road. A locus data generation means is configured to generate locus data indicating a plurality of position coordinates of the GPS receiver during a past specified period based on a position coordinate acquired by the position information acquisition means. A road estimation means is configured to estimate a road section traveled by the GPS receiver during the past specified period based on road data stored by the road data storage means and a position coordinate acquired by the position information acquisition means. A bias error estimation means is configured to estimate a bias error of a position coordinate measured by the GPS receiver based on position coordinates at a plurality of points in a road section estimated by the road estimation means and position coordinates at a plurality of points indicated by the locus data. A correction output means is configured to correct a position coordinate measured by the GPS receiver based on a bias error estimated by the bias error estimation means and output the corrected position coordinate.

According to another example of the present invention, a method is provided for achieving the functions of the above position correction apparatus.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
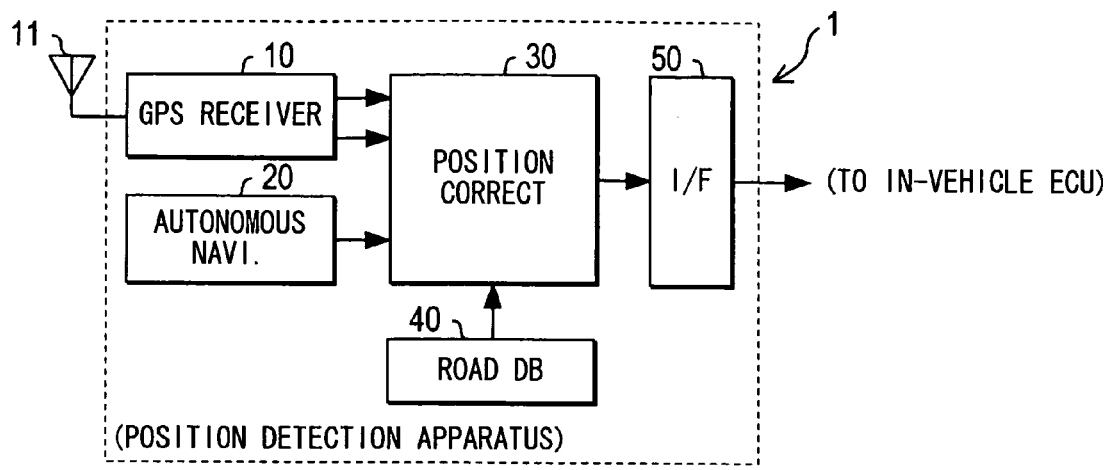
FIG. 1 is a block diagram showing a construction of a position detection apparatus according to an embodiment of the present invention.

Embodiments of the present invention will be described in further detail with reference to the accompanying drawings. FIG. 1 is a explanatory diagram showing a construction of a position detection apparatus 1 mounted on a subject vehicle.

As shown in FIG. 1, the position detection apparatus 1 according to an embodiment of the present invention includes a GPS (Global Positioning System) receiver 10, an autonomous navigation sensor group 20, a position correction section 30, a road database 40 (means for storing road data), and an interface (I/F) section 50. The position correction section 30 can be also referred to as a position correction apparatus.

The GPS receiver 10 is constructed similarly to a known GPS receiver. The GPS receiver 10 receives a GPS signal transmitted from a GPS satellite via an antenna 11 and extracts a GPS message from the GPS signal. The GPS receiver 10 performs a geometric operation to calculate a position coordinate P for the own apparatus based on a pseudo distance and satellite orbit information about multiple (four or more) GPS satellites. The position coordinate P is calculated in a three-dimensional coordinate system such as an ENU coordinate system or an ECEF coordinate system.

The GPS receiver 10 according to the embodiment calculates a speed vector V of the own apparatus based on a Doppler shift quantity of a GPS signal. A known method is used to calculate the speed vector V based on the Doppler shift quantity of the GPS signal. The following simply describes the method of calculating the speed vector V. When calculating the speed vector V, the method calculates speed vectors of multiple (four or more) GPS satellites from received messages. The method further calculates a unit direction vector from the GPS receiver to the GPS satellite. The method calculates the speed vector V of the own apparatus based on these pieces of vector information, a carrier frequency of a GPS signal received from each GPS satellite, and a carrier frequency of a GPS signal to be transmitted from each GPS satellite.

The GPS receiver 10 outputs the calculated speed vector V as well as the position coordinate P of the own apparatus to the position correction section 30. The GPS receiver 10 outputs measurement accuracy information as well as the position coordinate P and the speed vector V. The measurement accuracy information represents a measurement accuracy $\epsilon p$ of the position coordinate P and a measurement accuracy $\epsilon v$ of the speed vector V calculated based on DOP values.

The embodiment does not require accurate information about the measurement accuracies $\epsilon p$ and $\epsilon v$. Any method may be used to calculate the measurement accuracy. For example, the measurement accuracy $\epsilon p$ of the position coordinate P can be found from the product of the DOP value and an average difference between measured and estimated distances between each GPS satellite and the GPS receiver. Similarly, the measurement accuracy $\epsilon v$ of the speed vector V can be found from the product of the DOP value and a difference between measured and estimated speeds of the GPS receiver.

The autonomous navigation sensor group 20 includes multiple autonomous navigation sensors such as a wheel speed sensor, an acceleration sensor, a yaw rate sensor. Outputs from the sensors belonging to the autonomous navigation sensor group 20 are input to the position correction section 30.

The road database 40 stores road data representing position coordinates of roads in specific regions (e.g., all over Japan). The road data may be replaced with link data and node data that are contained in a map database of a known car navigation system and represent road positions and the connection relation between roads. The position detection apparatus 1 may be additionally provided with a route guidance function and may be constructed as a car navigation system.

The interface section 50 communicates with various control ECUs mounted in the vehicle. The control ECUs include an engine ECU for engine control, a brake ECU for brake control, and a steering ECU for steering control. The interface section 50 supplies the control ECUs with a position coordinate Po of the vehicle detected by the position detection apparatus 1. The interface section 50 is constructed as a serial interface or a LAN (CAN communication) interface. The interface section 50 supplies the detected position coordinate Po to the control ECUs in the vehicle.

Figure 2:
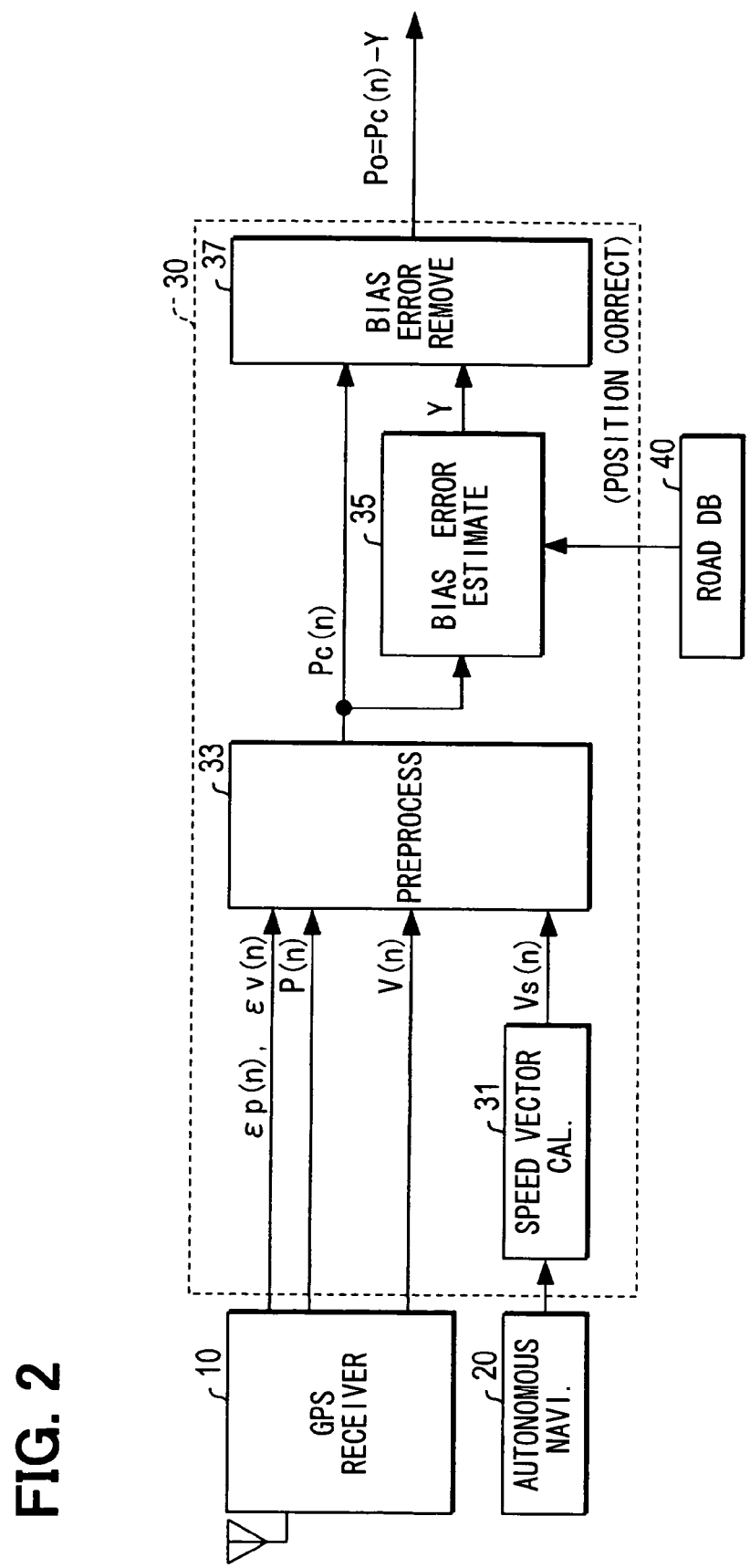
FIG. 2 is a block diagram showing a construction of a position correction section.

The position correction section 30 removes a bias error from the position coordinate P of the GPS receiver 10 measured by the GPS receiver 10 and outputs the corrected position coordinate Po outside via the interface section 50. The position correction section 30 is specifically constructed as shown in FIG. 2. FIG. 2 is a block diagram showing a detailed construction of the position correction section 30.

As shown in FIG. 2, the position correction section 30 includes an autonomous speed vector calculation section 31, a preprocessing section 33, a bias error estimation section 35, and a bias error removal section 37.

The autonomous speed vector calculation section 31 is connected to the sensors included in the autonomous navigation sensor group 20. Based on outputs from the sensors, the autonomous speed vector calculation section 31 outputs a displacement magnitude per unit time of the vehicle, namely, a speed vector Vs of the vehicle. The autonomous speed vector calculation section 31 outputs the calculated speed vector Vs of the vehicle to the preprocessing section 33.

The preprocessing section 33 (means for acquiring a position coordinate) is connected to the GPS receiver 10 and the autonomous speed vector calculation section 31. The preprocessing section 33 corrects the position coordinate P based on the position coordinate P acquired from the GPS receiver 10, the speed vector V, information about the measurement accuracies $\epsilon p$ and $\epsilon v$, and information about the speed vector Vs acquired from the autonomous speed vector calculation section 31. The preprocessing section 33 outputs the corrected position coordinate Pc to the bias error estimation section 35 and the bias error removal section 37.

Figure 3:
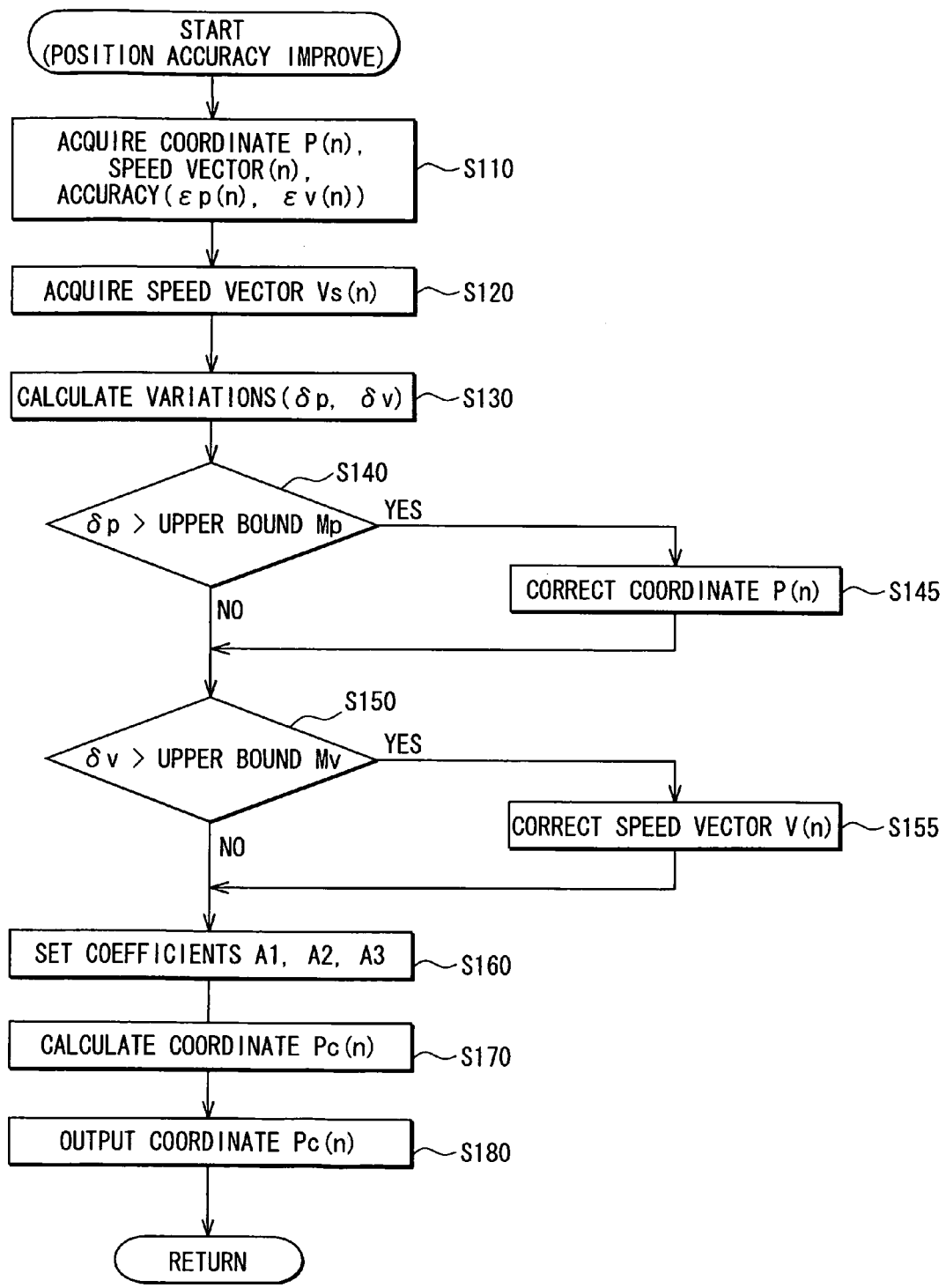
FIG. 3 is a flow chart showing a positioning accuracy improvement process performed by a preprocessing section.

Specifically, the preprocessing section 33 performs a positioning accuracy improvement process in FIG. 3 to correct the position coordinate P. FIG. 3 is a flow chart of the positioning accuracy improvement process repeatedly performed by the preprocessing section 33. Specifically, the preprocessing section 33 repeatedly performs the positioning accuracy improvement process at cycle T in synchronization with a measurement cycle T of the GPS receiver 10 and a vector calculation cycle T of the autonomous speed vector calculation section 31.

When starting the positioning accuracy improvement process, the preprocessing section 33 acquires the most recently measured position coordinate P(n) and speed vector V(n) and information about the measurement accuracies $\epsilon p(n)$ and $\epsilon v(n)$ from the GPS receiver 10 (S110). Further, the preprocessing section 33 acquires information about the most recently measured speed vector Vs(n) from the autonomous speed vector calculation section 31 (S120).

A suffix (n) attached to the parameters P, V, $\epsilon p$, $\epsilon v$, and Vs signifies that values for the parameters P, V, $\epsilon p$, $\epsilon v$, and Vs are acquired at the most recent cycle. A suffix (n−1) signifies that values for the parameters P, V, $\epsilon p$, $\epsilon v$, and Vs are acquired at the second most recent cycle.

Upon completion of the process at S120, the preprocessing section 33 processes the position coordinate P(n) and the speed vector V(n) acquired from the GPS receiver 10 (S130). Specifically, the preprocessing section 33 calculates variations $\delta p$ and $\delta v$ from the most recently acquired value P(n−1) for the position coordinate P(n) and the most recently acquired value V(n−1) for the speed vector V(n).

$$\delta p = |P(n) - P(n-1)|$$

$$\delta v = |V(n) - V(n-1)|$$

After calculating variations δp and δv, the preprocessing section 33 proceeds the process to S140 and determines whether or not the variation δp is greater than an upper bound Mp. The upper bound Mp can be preset to a theoretical maximum distance traveled by the vehicle during an elapse of time T at the design stage.

When determining that the variation δp is greater than the upper bound Mp (Yes at S140), the preprocessing section 33 corrects the position coordinate P(n) acquired from the GPS receiver 10 so that δp=Mp is satisfied (S145). Specifically, the preprocessing section 33 updates the position coordinate P(n) to a value resulting from adding the previous value P(n−1) and the vector Mp·(P(n)−P(n−1))/δp. The preprocessing section 33 then proceeds to S150.

$$P(n) \leftarrow P(n-1) + Mp \cdot (P(n) - P(n-1))/\delta p$$

When determining that the variation δp is smaller than or equal to the upper bound Mp (No at S140), the preprocessing section 33 proceeds to S150 by skipping the process at S145. The preprocessing section 33 determines whether or not the variation δv is greater than the upper bound Mv (S150). The upper bound Mv can be preset to a theoretical maximum speed of the vehicle during an elapse of time T at the design stage.

When determining that the variation δv is greater than the upper bound Mv (Yes at S150), the preprocessing section 33 corrects the speed vector V(n) acquired from the GPS receiver 10 so that δv=Mv is satisfied (S155). Specifically, the preprocessing section 33 updates the speed vector V(n) to a value resulting from adding the previous value V(n−1) and the vector Mv·(V(n)−V(n−1))/δv. The preprocessing section 33 then proceeds to S160.

$$V(n) \leftarrow V(n-1) + Mv \cdot (V(n) - V(n-1))/\delta v$$

When determining that the variation δv is smaller than or equal to the upper bound Mv (No at S150), the preprocessing section 33 proceeds to S160 by skipping the process at S155.

At S160, the preprocessing section 33 follows a built-in coefficient setting map to set coefficients A1, A2, and A3 to values corresponding to measurement accuracies εp(n) and εv(n). The preprocessing section 33 then calculates the position coordinate Pc(n) using the following equation based on the previously calculated position coordinate Pc(n−1) (S170).

$$Pc(n) = A1 \cdot P(n) + A2 \cdot (Pc(n-1) + V(n) \cdot T) + A3 \cdot (Pc(n-1) + Vs(n) \cdot T)$$

A parameter T is equivalent to an execution cycle T of the positioning accuracy improvement process. A parameter Pc(n) represents a position coordinate Pc of the most recent cycle. A parameter Pc(n−k) represents the position coordinate Pc calculated at the kth cycle previous to the most recent cycle.

At S170, the preprocessing section 33 calculates a weighting average between the position coordinate P(n), the position coordinate P(n−1)+V(n)·T, and the position coordinate P(n−1)+Vs(n)·T in accordance with the coefficients A1, A2, and A3. The position coordinate P(n) is acquired from the GPS receiver 10. The position coordinate P(n−1)+V(n)·T is found based on the speed vector V(n). The position coordinate P(n−1)+Vs(n)·T is found based on an output from the autonomous navigation sensor group 20.

Upon completion of calculating the position coordinate Pc(n), the preprocessing section 33 outputs the position coordinate Pc(n) to the bias error estimation section 35 and the bias error removal section 37 (S180). The preprocessing section 33 then terminates the positioning accuracy improvement process.

Figures 4A, 4B:
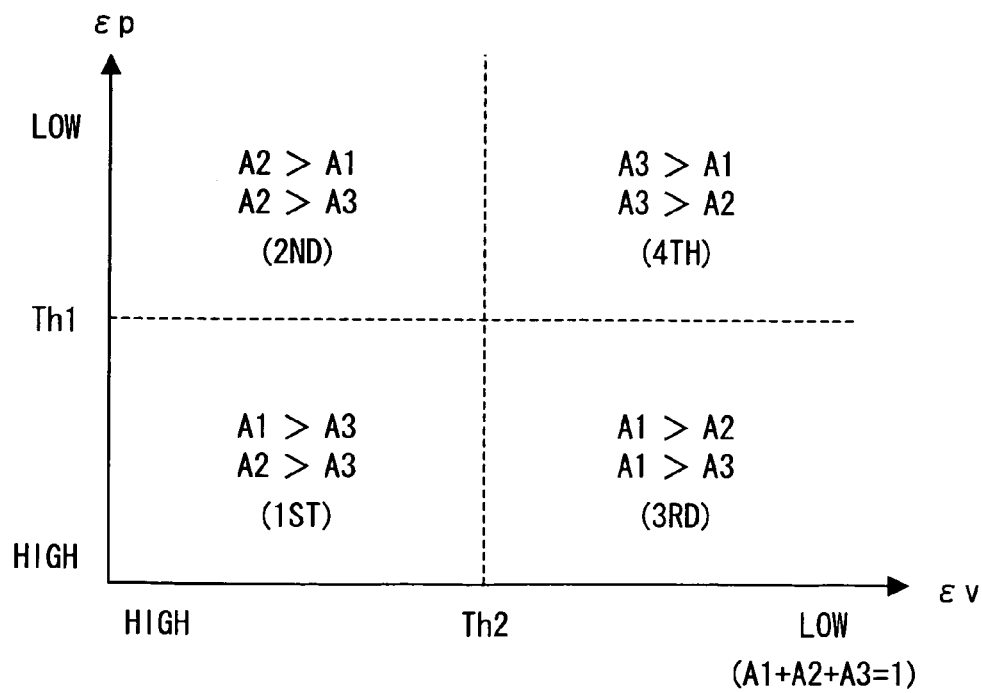
FIG. 4A is an explanatory diagram showing a construction of a coefficient setting map.
FIG. 4B is an explanatory diagram showing how to define magnitude relation between coefficients.

The embodiment dynamically configures the coefficients A1, A2, and A3 from the coefficient setting map at S160. In addition, the coefficients A1, A2, and A3 may be dynamically configured from a predetermined equation. However, an actual equation for configuring the coefficients depends on the method of configuring the measurement accuracies εp and εv and is therefore not described here. The embodiment uses the coefficient setting map to configure the coefficients A1, A2, and A3. An example will be described with reference to FIGS. 4A and 4B. FIG. 4A is an explanatory diagram showing a configuration of the coefficient setting map. FIG. 4B is an explanatory diagram showing a method of configuring the coefficients A1, A2, and A3 marked with the magnitude relation therebetween.

As shown in FIG. 4A, the coefficient setting map has predetermined areas for the measurement accuracies εp and εv. Each area contains the coefficients A1, A2, and A3 so as to satisfy the conditions A1+A2+A3=1, A1≧0, A2≧0, and A3≧0. Based on the coefficient setting map, the preprocessing section 33 determines an area that contains measurement accuracy information εp(n) and εv(n) acquired from the GPS receiver 10. The preprocessing section 33 settles values of the coefficients A1, A2, and A3 in accordance with a combination of the coefficients A1, A2, and A3 described in the coefficient setting map associated with the determined area.

Specifically, the embodiment assigns threshold values Th1 and Th2 to the measurement accuracies εp and εv and four areas to a coordinate space for the measurement accuracies εp and εv. That is, a first area is defined so as to satisfy εp<Th1 and εv<Th2. A second area is defined so as to satisfy εp≧Th1 and εv<Th2. A third area is defined so as to satisfy εp<Th1 and εv≧Th2. A fourth area is defined so as to satisfy εp≧Th1 and εv≧Th2. According to the embodiment, decreasing values of the measurement accuracies εp and εv increase the accuracy. In other words, larger values of the measurement accuracies εp and εv indicate a possibility of larger errors in positions and speeds measured by the GPS receiver 10.

The first area defines coefficients A1, A2, and A3 so that the coefficient A3 becomes smaller than the coefficients A1 and A2. When the position coordinate P(n) and the speed vector V(n) acquired from the GPS receiver 10 indicate a high measurement accuracy, the embodiment configures the coefficients A1, A2, and A3 so as to increase a weight for the position coordinate Pc(n−1)+V(n)·T found based on the position coordinate P(n) and the speed vector V(n) acquired from the GPS receiver 10. The embodiment corrects the position coordinate P(n) and finds the position coordinate Pc(n).

The second area defines coefficients A1, A2, and A3 so that the coefficient A2 becomes smaller than the coefficients A1 and A3. When the measurement accuracy for the position coordinate P(n) is low and the measurement accuracy for the speed vector V(n) is high, the embodiment configures the coefficients A1, A2, and A3 so as to increase a weight for the position coordinate Pc(n−1)+V(n)·T found based on the speed vector V(n). The embodiment corrects the position coordinate P(n) and finds the position coordinate Pc(n).

The third area defines coefficients A1, A2, and A3 so that the coefficient A1 becomes larger than the coefficients A2 and A3. When the measurement accuracy for the position coordinate P(n) is high and the measurement accuracy for the speed vector V(n) is low, the embodiment configures the coefficients A1, A2, and A3 so as to increase a weight for the position coordinate P(n) acquired from the GPS receiver 10. The embodiment corrects the position coordinate P(n) and finds the position coordinate Pc(n).

The fourth area defines coefficients A1, A2, and A3 so that the coefficient A3 becomes larger than the coefficients A1 and A2. When the position coordinate P(n) and the speed vector V(n) acquired from the GPS receiver 10 indicate a low measurement accuracy, the embodiment configures the coefficients A1, A2, and A3 so as to increase a weight for the position coordinate Pc(n−1)+V(n)·T found from outputs from the autonomous navigation sensor group 20. The embodiment corrects the position coordinate P(n) and finds the position coordinate Pc(n).

In this manner, the preprocessing section 33 corrects the position coordinate P(n) acquired from the GPS receiver 10 to acquire the highly accurate position coordinate Pc(n). The preprocessing section 33 then outputs the position coordinate Pc(n) to the bias error estimation section 35 and the bias error removal section 37.

The following describes operations of the bias error estimation section 35. The bias error estimation section 35 acquires the position coordinate Pc output from the preprocessing section 33. The bias error estimation section 35 uses the acquired information and road data stored in the road database 40 to estimate a road section traveled by the GPS receiver 10 and estimate a bias error.

Figure 5A:
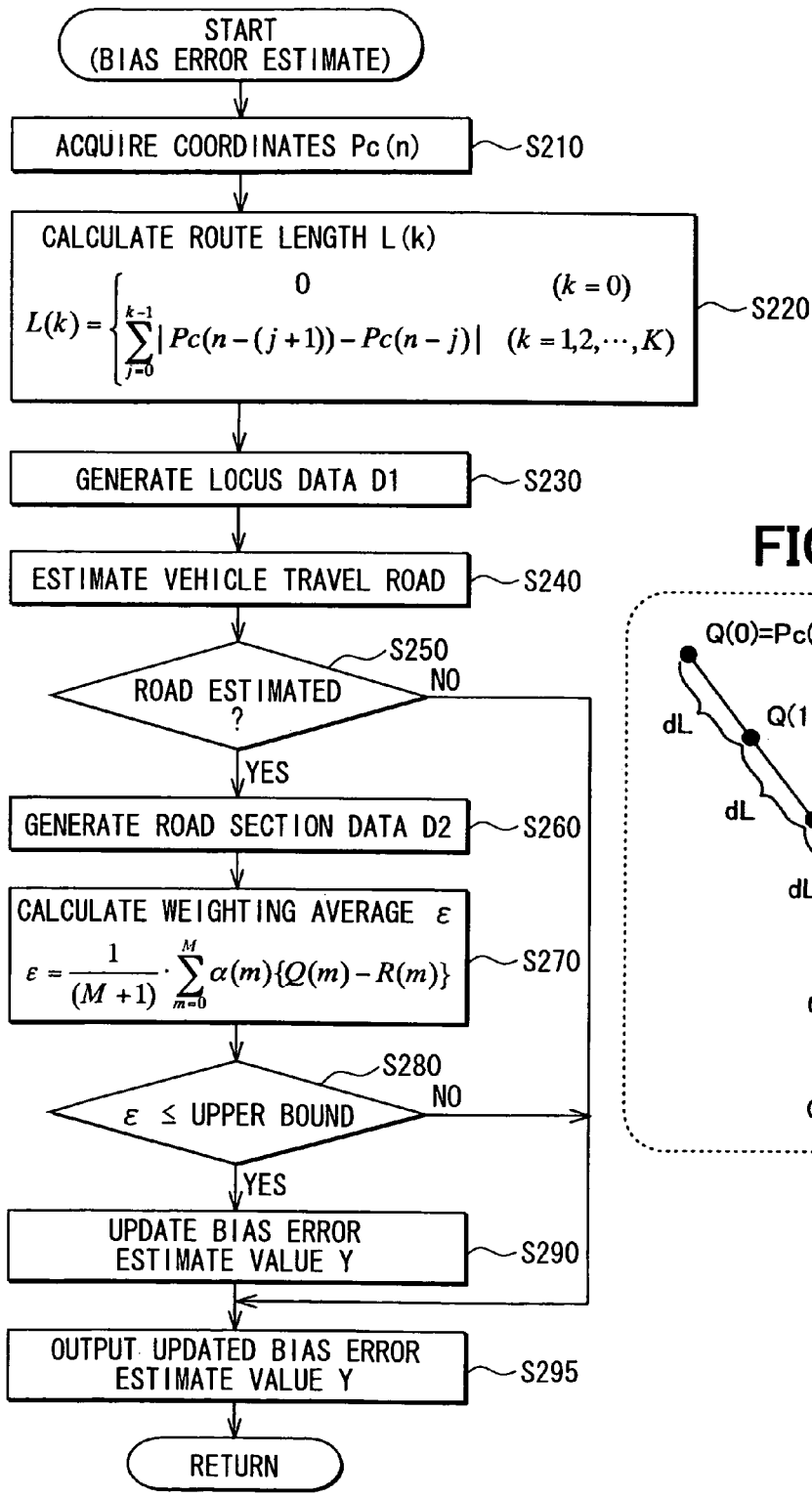
FIG. 5A is a flow chart showing a bias error estimation process performed by a bias error estimation section.

FIG. 5A is a flow chart showing a bias error estimation process performed by the bias error estimation section 35. The bias error estimation section 35 interlocks with the preprocessing section 33 and periodically performs the bias error estimation process in FIG. 5A at cycle T to find a bias error estimate value Y.

When starting the bias error estimation process, the bias error estimation section 35 acquires the position coordinate Pc(n) from the preprocessing section 33 and records it in a built-in buffer (S210).

Upon completion of this process, the bias error estimation section 35 recognizes multiple position coordinates {Pc(n−k)|k=0, 1, 2, . . . , and K} acquired during t=K·T hours before the current point. Based on these position coordinates, the bias error estimation section 35 uses a linear interpolation technique to calculate a route length L(k) between the current point Pc(n) and a point Pc(n−k) measured t=K·T hours before the current point Pc(n) for each of points Pc(n−k), where k=0, 1, . . . , and K (S220).

$$L(k) = \begin{cases} 0 & (k=0) \\ \sum_{j=0}^{k-1} |Pc(n-(j+1)) - Pc(n-j)| & (k=1, 2, \ldots, K) \end{cases} \quad \text{[Equation 1]}$$

The bias error estimation section 35 (means for generating locus data) generates locus data D1 representing a travel locus (or swept path) of the GPS receiver 10 based on the relation between the route length L(k) and the position coordinate Pc(n−k) (S230).

Figure 5B:
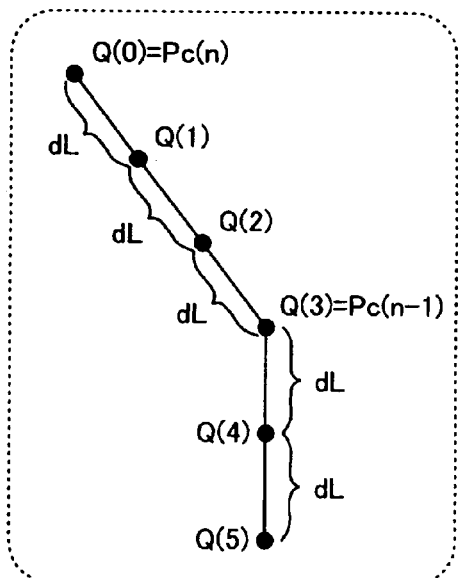
FIG. 5B is a diagram explaining an example of dividing a route.

For instance, as shown in FIG. 5B, the bias error estimation section 35 divides a route between the current point Pc(n) and the point Pc(n−K) into M equal route length intervals dL. The bias error estimation section 35 uses a linear interpolation technique to find position coordinates Q(1), Q(2), . . . , and Q(M−1) at the divided points. The bias error estimation section 35 describes the position coordinates Q(1), Q(2), . . . , and Q(M−1) and position coordinates Q(0)=Pc(n) and Q(M)=Pc(n−K) at both end points to generate locus data D1={Q(0), Q(1), Q(2), . . . , Q(M−1), and Q(M)}. A position coordinate Q(m), where m=0, 1, 2, . . . , and M, represents a point tracking back for a length of m·dL from the current point Q(0)=Pc(n) along the route (travel locus of the GPS receiver 10).

Figure 6A:
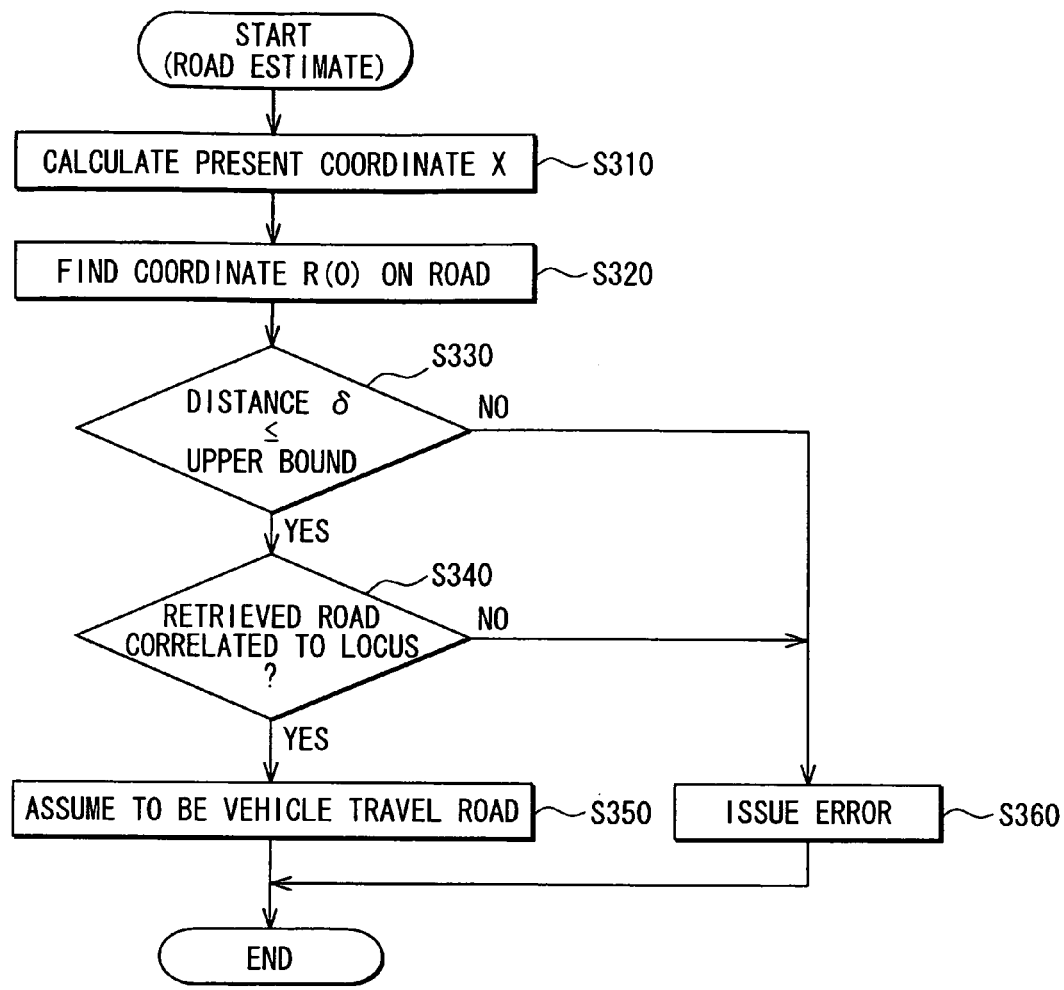
FIG. 6A is a flow chart showing a road estimation process performed by the bias error estimation section.

Upon completion of generating the locus data D1, the bias error estimation section 35 (means for estimating a road section) proceeds to S240 and estimates a vehicle travel road based on the position coordinate Q(0) and road data stored in the road database 40. That is, the bias error estimation section 35 estimates a road traveled by the GPS receiver 10. Specifically, the bias error estimation section 35 performs a road estimation process in FIG. 6A to estimate the vehicle travel road. FIG. 6A is a flow chart showing the road estimation process performed by the bias error estimation section 35.

When starting the road estimation process, the bias error estimation section 35 (means for correcting a position coordinate) corrects the position coordinate Q(0) using the last estimated bias error estimate value Y and calculates a currently estimated position coordinate X (S310). Specifically, the bias error estimation section 35 calculates the position coordinate X using the following equation.

$$X = Q(0) - Y$$

For example, let us suppose the following conditions. An ENU coordinate system is used as the position coordinate system. The position coordinate Q(0) is represented by a vector Q(0)=(QE(0), QN(0), QU(0)) in the ENU coordinate system. The bias error estimate value Y is represented by Y=(YE, YN, YU). The bias error estimation section 35 then calculates X=(QE(0)−YE, QN(0)−YN, QU(0)−YU) assuming the position coordinate X to be (XE, XN, XU).

The bias error estimation section 35 updates the bias error estimate value Y at S290. When performing the process at S240 for the first time, the bias error estimation section 35 uses a predetermined initial value Y0 as the current bias error estimate value Y.

Upon completion of this process, the bias error estimation section 35 searches road data stored in the road database 40 for a road nearest to the position coordinate X, namely a road having a shortest direct distance from the position coordinate X. The bias error estimation section 35 finds a position coordinate R(0)=(RE(0), RN(0), RU(0)) at a point on the road nearest to the position coordinate X (S320). When position coordinate X is already assigned to a road, the bias error estimation section 35 defines the coordinate R(0)=X.

Figure 6B:
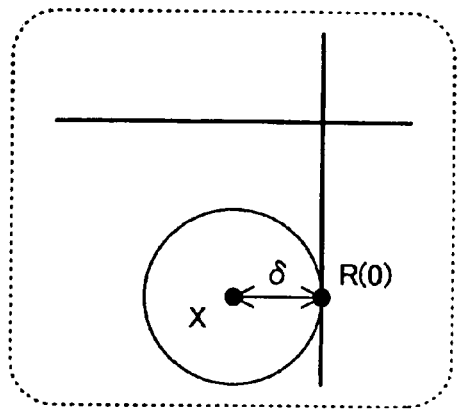
FIG. 6B is a diagram explaining an example of finding a nearest point on road.

After finding the position coordinate R(0), the bias error estimation section 35 calculates a distance δ=|X−R(0)| between the coordinate X and the coordinate R(0), as shown in FIG. 6B. The bias error estimation section 35 determines whether or not the distance δ is smaller than or equal to an upper bound (S330). When determining that the distance δ is smaller than or equal to the upper bound (Yes at S330), the bias error estimation section 35 proceeds to S340. When determining that the distance δ exceeds the upper bound (No at S330), the bias error estimation section 35 proceeds to S360.

At S340, the bias error estimation section 35 determines whether or not the retrieved road nearest to the specified position coordinate X has a planar road configuration (or a road shape in view of upper surface of a road) correlated to the travel locus indicated by the locus data D1 of the GPS receiver 10.

Specifically at S340, the bias error estimation section 35 finds a position coordinate R(1) of the point that exits on the road nearest to the position coordinate X specified at S320 and is distanced from the coordinate R(0) by the distance dL equal to the locus data D1 along the road.

Figure 7A:
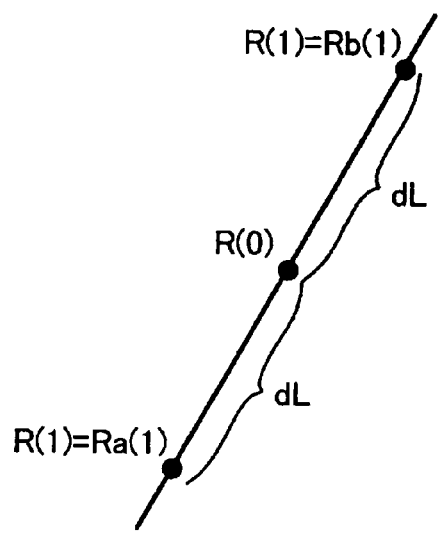
FIG. 7A is an explanatory diagram showing positional relation between coordinates.

When not dead-ending, a road extends in two directions from the coordinate R(0). When the specified road extends in two directions from the coordinate R(0), the bias error estimation section 35 finds the position coordinate R(1) at a position coordinate Ra(1), Rb(1) corresponding to the point distanced from the coordinate R(0) by the distance dL along the road in each of the directions. FIG. 7A is an explanatory diagram showing the relation between the position coordinate R(1) and the position coordinate R(0).

Upon completion of the process, the bias error estimation section 35 calculates a vector Z1=Q(1)−Q(0) and a vector Z2=R(1)−R(0). When the specified road extends in two directions from the coordinate R(0), the bias error estimation section 35 calculates the vector Za=Ra(1)−R(0) and the vector Zb=Rb(1)−R(0) as the vector Z2.

After calculating the vectors Z1 and Z2, the bias error estimation section 35 calculates an angle θ between the vectors Z1 and Z2.

$$\theta = \arccos(Z1 \cdot Z2/(|Z1| \cdot |Z2|))$$

Figure 7B:
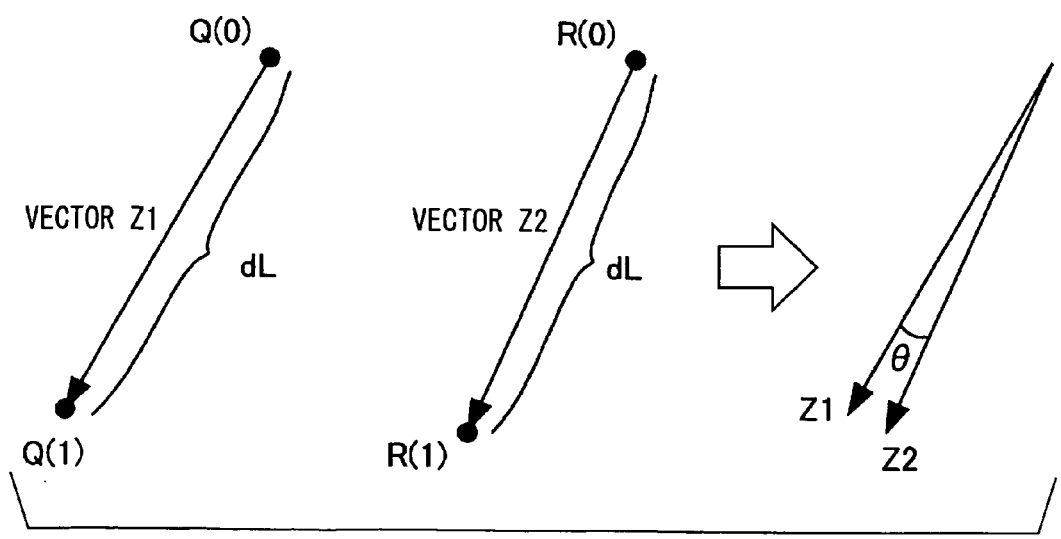
FIG. 7B is an explanatory diagram showing an angle between vectors.

FIG. 7B is an explanatory diagram showing a method of setting the vectors Z1 and Z2 and the angle θ between the vectors Z1 and Z2.

When the angle θ is smaller than or equal to a threshold value θth (θ≦θth), the planar configuration of the specified road is assumed to be similar to the travel locus of the GPS receiver 10. The bias error estimation section 35 determines that the road correlates with the travel locus of the GPS receiver 10 (Yes at S340).

When the angle θ exceeds the threshold value θth (θ>θth), the planar configuration of the specified road is not assumed to be similar to the travel locus of the GPS receiver 10. The bias error estimation section 35 determines that the road does not correlate with the travel locus of the GPS receiver 10 (No at S340).

When calculating the vectors Za and Zb as the vector 72, the bias error estimation section 35 calculates an angle θa between the vectors Z1 and Za and an angle θb between the vectors Z1 and Zb. When the angle θa or θb is smaller than or equal to the threshold value θth, the bias error estimation section 35 assumes the determination result to be Yes at S340. Only when both angles θa and θb exceed the threshold value θth, the bias error estimation section 35 assumes the determination result to be No at S340. When the angle θa or θb is smaller than or equal to the threshold value θth, the bias error estimation section 35 discards the coordinate Ra(1) or Rb(1) whichever provides a large angle θ. The bias error estimation section 35 determines the position coordinate R(1) using the coordinate Ra(1) or Rb(1) whichever provides a small angle θ.

In this manner, the bias error estimation section 35 determines whether or not the specified road correlates with the travel locus of the GPS receiver 10 (S340). When determining that the specified road correlates with the travel locus of the GPS receiver 10 (Yes at S340), the bias error estimation section 35 proceeds to S350 and assumes the specified road to be the vehicle travel road. The bias error estimation section 35 then terminates the road estimation process.

When determining that the specified road does not correlate with the travel locus of the GPS receiver 10 (No at S340), the bias error estimation section 35 proceeds to S360 and issues an error by determining that any vehicle travel road cannot be estimated correctly. The bias error estimation section 35 then terminates the road estimation process.

The bias error estimation process according to the embodiment estimates the vehicle travel road assuming that the GPS receiver 10 moves along with the vehicle on the road. The process estimates a bias error by comparing the vehicle travel road with the travel locus of the GPS receiver 10. Accordingly, the vehicle travel road needs to be estimated correctly at S240.

For this reason, the threshold value θth needs to be set to a value sufficiently smaller than π/4, for example. Defining the threshold value θth in this manner can prevent a road crossing the road actually traveled by the vehicle from being assumed to be the vehicle travel road. The road estimation process can correctly estimate the vehicle travel road, i.e., the road traveled by the GPS receiver 10.

The embodiment notifies an error when the distance δ exceeds the upper bound. This is because the specified road is less possibly the vehicle travel road. The road estimation process according to the embodiment can solve the problem of inadvertently assuming such a road to be the vehicle travel road.

Upon completion of the road estimation process at S240, the bias error estimation section 35 proceeds to S250 and determines whether or not the road estimation process has estimated the vehicle travel road. Specifically, when the road estimation process issues an error, the bias error estimation section 35 determines No at S250 assuming that the vehicle travel road cannot be estimated. When the road estimation process issues no error and estimates the vehicle travel road, the bias error estimation section 35 determines Yes at S250.

When the vehicle travel road cannot be estimated (No at S250), the bias error estimation section 35 proceeds to S295 and outputs the last updated bias error estimate value Y. The bias error estimation section 35 then terminates bias error estimation process. When performing the process at S290 for the first time, the bias error estimation section 35 outputs the predetermined initial value Y0.

When determining that the vehicle travel road can be estimated (Yes at S250), the bias error estimation section 35 proceeds to S260 and generates road section data D2={R(0), R(1), . . . , R(M)} representing position coordinates for multiple points in road sections estimated to be traveled by the vehicle.

The position coordinates R(0) and R(1) included in the road section data D2 are equivalent to those found in the road estimation process (S240). The position coordinate R(m) (m=0, 1, 2, . . . , M) represents a position tracking back toward a point R(1) from the point R(0) as the reference point for a length of m·dL along the road.

At S260, similarly to the locus data D1, the bias error estimation section 35 finds position coordinates R(2) through R(M) for the points except the already found position coordinates R(0) and R(1) at an interval of distance dL on the road using the point R(0) as the reference point. The bias error estimation section 35 describes the position coordinates R(0), R(1), . . . , and R(M) to generate the road section data.

Figure 8:
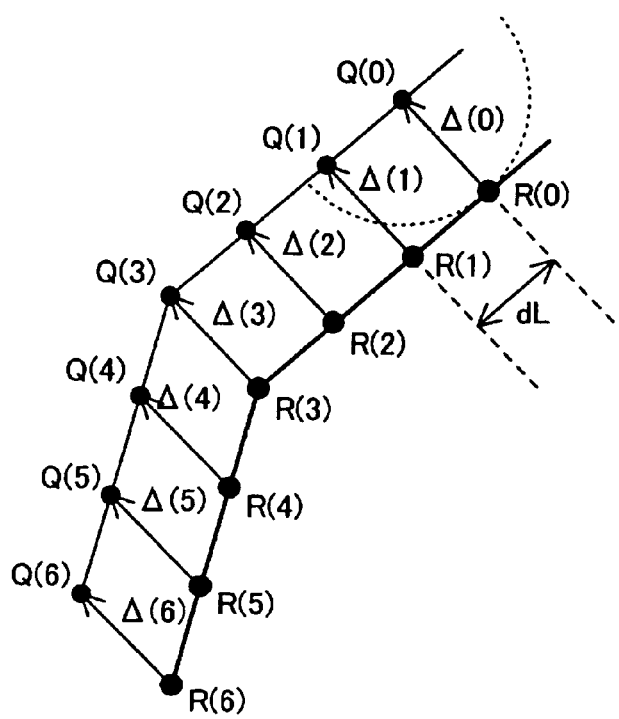
FIG. 8 is an explanatory diagram concerning how to calculate a weighting average.

Upon completion of this process, the bias error estimation section 35 proceeds to S270. Based on the locus data D1 and the road section data D2, the bias error estimation section 35 (means for estimating a bias error) calculates an error Δ(m)= Q(m)−R(m) between the position coordinate Q(m) for each point indicated by the locus data D1 and the position coordinate R(m) corresponding to the position coordinate Q(m) as shown in FIG. 8. The bias error estimation section 35 further calculates the weighting average ε.

$$\varepsilon = \frac{1}{(M+1)} \cdot \sum_{m=0}^{M} \alpha(m)\{Q(m) - R(m)\} \quad \text{[Equation 2]}$$

FIG. 8 is an explanatory diagram concerning a method of calculating the weighting average ε. A parameter α={α(0), α(1), . . . , α(M)} in the above-mentioned equation is a weighting coefficient that satisfies the following equation.

$$\sum_{m=0}^{M} \alpha(m) = 1$$ [Equation 3]

$$\alpha(0) > \alpha(1) > \alpha(2) > \ldots > \alpha(m) > \ldots > \alpha(M)$$

The embodiment calculates the weighting average ε by giving a larger weight to an error Δ(m)=Q(m)−R(m), where m=0, 1, . . . , M, at each point in an area where the GPS receiver 10 performs positioning more recently. As shown in FIG. 8, Δ(m) represents an error between the position coordinate Q(m)=(QE(m), QN(m), QU(m)) and the position coordinate R(m)=(RE(m), RN(m), RU(m)) on the road corresponding to the position coordinate Q(m) in the directions E, N, and U (Δ(m)=(QE(m)−RE(m), QN(m)−RN(m), QU(m)−RU(m))). The weighting average ε represents a weighting average of errors between the direction components in a vector form.

After calculating the weighting average ε, the bias error estimation section 35 proceeds to S280 and determines whether or not the calculated weighting average ε is smaller than or equal to a predetermined upper bound. When determining that the weighting average ε is smaller than or equal to the predetermined upper bound (Yes at S280), the bias error estimation section 35 proceeds to S290 and updates the bias error estimate value Y to the weighting average ε calculated at S270 (Y←ε). The bias error estimation section 35 outputs the updated bias error estimate value Y to the bias error removal section 37 (S295). The bias error estimation section 35 then terminates the bias error estimation process.

When determining that the weighting average ε exceeds the upper bound (No at S280), the bias error estimation section 35 skips S290 and proceeds to S295 and outputs the bias error estimate value Y to the bias error removal section 37. The bias error estimation section 35 then terminates the bias error estimation process. When the weighting average ε is large and the estimated vehicle travel road is quite possibly incorrect, the bias error estimation section 35 outputs the last updated value as the bias error estimate value Y without updating it.

According to the embodiment, the bias error removal section 37 interlocks with the preprocessing section 33 and the bias error estimation section 35. The bias error estimation section 35 outputs the bias error estimate value Y. Based on the bias error estimate value Y, the bias error removal section 37 removes a bias error from the positioning result Pc(n) input from the preprocessing section 33. The bias error removal section 37 (means for outputting the corrected position) outputs the corrected position coordinate Po=Pc(n)−Y outside via the interface section 50.

There has been described the position detection apparatus 1 according to the embodiment. The position detection apparatus 1 calculates the bias error estimate value Y from the position coordinates Q(0), Q(1), . . . , and Q(M) at the measured points and the position coordinates R(0), R(1), . . . , and R(M) at the points on the road. The position detection apparatus 1 compares the travel locus of the GPS receiver 10 with the road configuration throughout multiple points to estimate a bias error.

Specifically, the embodiment defines points at the equal distance interval dL from the position coordinate R(0) to find the position coordinates R(1) through R(M) for the defined points. The embodiment finds the position coordinate R(m) on the road corresponding to the position coordinate Q(m) for the points indicated by the locus data D1 in accordance with the positional relation between the points indicated by the locus data D1. The embodiment calculates the average ε of errors Δ(m) at the points as the bias error estimate value Y.

Accordingly, the position detection apparatus 1 can accurately estimate the bias error and accurately remove a bias error component from the positioning result from the GPS receiver 10 to correct the position.

A conventional technology corrects a positioning result based on the bias error information received from an FM broadcast station. When the FM broadcast station is situated far from the measuring point, the bias error indicated by the received information may greatly deviate from the true value of the bias error at the measuring point. The conventional technology cannot properly remove the bias error from the positioning result or accurately correct the positioning result. According to the embodiment, the above-mentioned method can accurately estimate the bias error at the measuring point and can correct the positioning result from the GPS receiver 10 more appropriately than the conventional technology. In addition, the position detection apparatus 1 need not install an FM receiver in the apparatus and can reduce manufacturing costs for products.

Figure 9A:
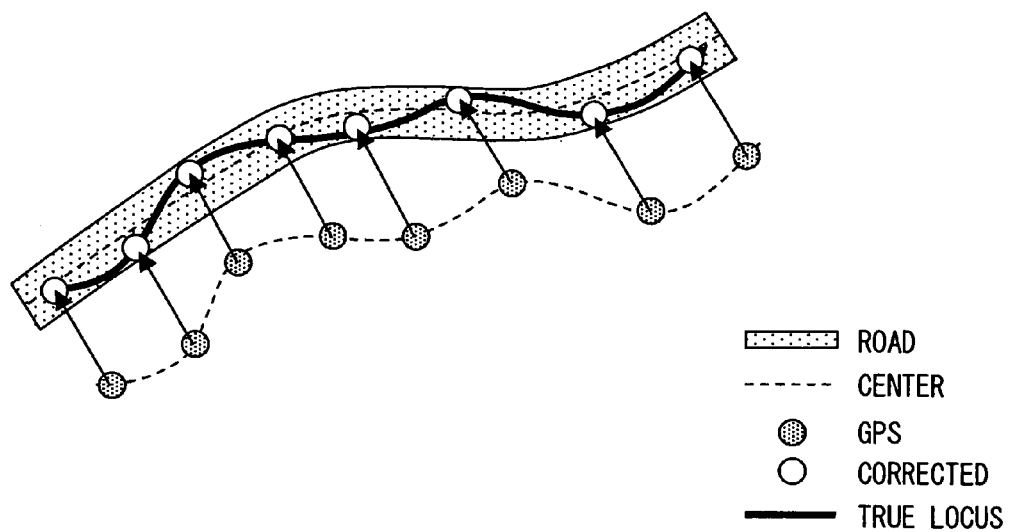
FIG. 9A is an explanatory diagram showing a method for correcting a positioning result according to the embodiment of the present invention.
Figure 9B:
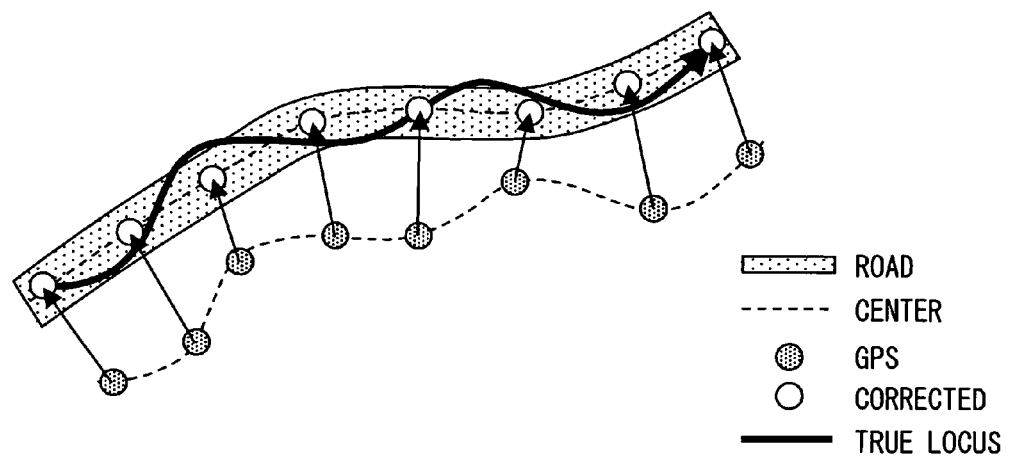
FIG. 9B is an explanatory diagram showing a method for correcting a positioning result in a related art.

A map matching technology in a related art compares a positioning result with a road position and forcibly adjusts the positioning result to the position coordinate on the road. As shown in FIG. 9B, the related art map matching technology cannot accurately represent a vehicle locus relative to the road or a vehicle movement with reference to the road. The embodiment can appropriately correct position coordinates according to the above-mentioned method and solve the problem, i.e., while representing the actual vehicle locus or vehicle movement. Thus, as shown in FIG. 9A, the vehicle movement can be accurately represented.

Further, the embodiment calculates the weighting average ε by giving a larger weight to an error at each point in an area where the GPS receiver 10 performs positioning more recently. The position detection apparatus 1 according to the embodiment can accurately estimate a bias error in proper accordance with changes in the ionization layer.

The embodiment estimates the vehicle travel road as follows. The embodiment corrects the preprocessed position coordinate Q(0)=Pc(n) measured by the GPS receiver 10 based on the previously estimated bias error. The corrected value X=Q(0)−Y is used to estimate a road nearest from the point X to be the vehicle travel road. Further, based on the angle θ between the vectors Z1 and Z2, the embodiment determines whether or not the planar configuration of the nearest road correlates with the locus of the measured position coordinate. The embodiment stops estimating the vehicle travel road when there is no correlation therebetween. Accordingly, the position detection apparatus 1 according to the embodiment can simply and accurately estimate the vehicle travel road (the road traveled by the GPS receiver 10).

The embodiment does not estimate the bias error based on the corresponding locus data (No at S250) when the position coordinate X is distant from the nearest road. The embodiment corrects the measured position coordinate Pc(n) using the calculated bias error estimate value Y and outputs the corrected position coordinate Po. The embodiment can prevent an incorrect position coordinate Po from being calculated and output due to an incorrectly estimated vehicle travel road.

The embodiment calculates the displacement magnitude Vs of the vehicle based on an output from the autonomous navigation sensor mounted on the vehicle. The embodiment corrects the position coordinate P measured by the GPS receiver 10 based on the displacement magnitude Vs. The embodiment generates locus data based on the corrected position coordinate Pc. Accordingly, the embodiment can suppress an effect of random errors and appropriately estimate a bias error.

The road database 40 functions as an example of means for storing road data or device. S110 of the process performed by the preprocessing section 33 functions as an example of means for acquiring a position coordinate or control unit. S210 through S230 of the process performed by the bias error estimation section 35 function as an example of means for generating locus data or control unit.

S240 and S260 of the process performed by the bias error estimation section 35 function as an example of means for estimating a road section or control unit. S270 and S290 of the process performed by the bias error estimation section 35 function as an example of means for estimating bias error or control unit. An operation of the bias error removal section 37 that calculates and outputs the position coordinate Po=Pc(n)−Y functions as an example of means for outputting the corrected position coordinate or control unit. S120 through S180 of the process performed by the autonomous speed vector calculation section 31 and the preprocessing section 33 function as an example of a preprocessing means or control unit.

The invention is not limited to the above-mentioned embodiments but may be otherwise variously embodied.

For example, the embodiment calculates the weighting average ϵ of errors Δ(m) as the bias error estimate value Y. The bias error estimate value Y may be calculated as a simple average of errors Δ(m). That is, bias error estimate value Y may be found by setting α(m)=1/(M+1) for all the m values.

The embodiment corrects the position coordinate P(n) measured by the GPS receiver 10 to the position coordinate Pc(n) and inputs the corrected position coordinate Pc(n) with the improved accuracy to the bias error estimation section 35 and the bias error removal section 37. The position detection apparatus 1 may be constructed so as to input the position coordinate P(n) measured by the GPS receiver 10 as is, instead of the position coordinate Pc(n), to the bias error estimation section 35 and the bias error removal section 37.

The embodiment uses the linear interpolation technique to generate locus data representing the vehicle travel locus at equal distance intervals based on the position coordinate Pc acquired from the GPS receiver 10 via the preprocessing section 33. The embodiment generates road section data representing the position coordinate R(m) of the road at equal distance intervals. The position coordinate R(m) is equivalent to a position coordinate at a point on the road corresponding to the position coordinate Q(m) for each point indicated by the locus data. The embodiment finds a bias error based on these pieces of data. It may be preferable to generate the locus data without the linear interpolation by representing the vehicle travel locus using the position coordinates Pc(n) through Pc(n−K) acquired from the preprocessing section 33. It may be preferable to find the position coordinate on the road corresponding to the position coordinate Pc at each point based on the position coordinate Pc indicated by the locus data at each point so that a distance between points becomes equal to that indicated by the locus data. Road section data may be generated accordingly. A bias error may be found based on these pieces of data. In this manner, it is possible to decrease arithmetic processing loads and reduce the amount of data.

Each or any combination of processes, steps, or means explained in the above can be achieved as a hardware unit with a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a position correction apparatus includes a bias error estimation means. The position correction apparatus estimates a bias error of a position coordinate measured by a GPS receiver and corrects the position coordinate measured by the GPS receiver based on the estimated bias error as follows.

The position correction apparatus allows a position information acquisition means to acquire a position coordinate measured by the GPS receiver. Based on the position coordinate acquired by the position information acquisition means, the position correction apparatus allows a locus data generation means to generate locus data that represents multiple points of position coordinates for the GPS receiver during a past specified period.

The position correction apparatus includes a road data storage means that stores road data representing position coordinates of a constructed road. The position correction apparatus allows a road estimation means to estimate a road section traveled by the GPS receiver during the past specified period based on the road data and position coordinates acquired by the position information acquisition means.

The bias error estimation means estimates a bias error based on position coordinates at multiple points in a road section estimated by the road estimation means and position coordinates at multiple points indicated by the locus data for the GPS receiver.

The position correction apparatus corrects a position coordinate measured by the GPS receiver based on a bias error estimated by the bias error estimation means and outputs the corrected position coordinate (correction output means).

The position correction apparatus is used to correct a positioning result from the GPS receiver mounted on a movable body such as a vehicle that moves on a road. The position correction apparatus estimates a bias error on the assumption that the movable body moves along the road. A feature of the position correction apparatus is to estimate a bias error based on the measured position coordinates at points and the position coordinates at points on the road.

The position correction apparatus can compare the travel locus of the GPS receiver with a road configuration throughout multiple points by estimating a bias error based on the measured position coordinates at points and the position coordinates at points on the road. A bias error can be thus accurately estimated.

A conventional technology corrects a positioning result based on bias error information received from an FM broadcast station. When the bias error indicated by the received information greatly deviates from the true value of the bias error at the measuring point, the conventional technology cannot properly remove the bias error from the positioning result or accurately correct the positioning result. According to the aspect of the disclosure, the above-mentioned method can accurately estimate a bias error at the measuring point. The position correction apparatus can more appropriately remove a bias error from the measured position coordinate and more accurately correct the positioning result than the conventional technology. In addition, the position detection apparatus need not install an FM receiver in the apparatus and can reduce manufacturing costs for products.

The map matching technology in a related art corrects a positioning result based on road data. The related art map matching technology compares a positioning result with a road position and forcibly adjusts the positioning result to the position coordinate on the road. Therefore, the technology necessarily causes the position coordinate of a movable body to overlap with a line representing the road and cannot accurately represent a movable body locus relative to the road or a movable body movement with reference to the road.

The above-mentioned method can appropriately find a bias error and appropriately correct a positioning result using the found bias error. The method can accurately represent the movement of the movable body and correct the position coordinate. Accordingly, applying this technology to vehicle control can detect vehicle movement with reference to a road. The technology can provide accurate control over determining dangerous driving and accordingly assisting a driver in operations.

When an attempt is made to correct a positioning result from the GPS receiver and find an accurate travel locus of a vehicle passing through a curve, for example, the related art technology compares a positioning result with a road position and adjusts the positioning result to the position coordinate on the road. As shown in FIG. 9B, the related art technology cannot make an appropriate correction. The correction eliminates movement information relative to the road, making it impossible to accurately represent the vehicle movement. It has been impossible to appropriately provide the control over determining dangerous driving and accordingly assisting a driver in operations based on a positioning result from the GPS receiver and a road configuration.

As shown in FIG. 9A, by contrast, the position correction apparatus according to the aspect of the disclosure can accurately estimate a bias error and correct a positioning result. The correction does not eliminate information about continuous changes of the position coordinate. The position correction apparatus can accurately represent the vehicle movement and accurately control for assisting driver operations.

The road estimation means can use positional relation between points indicated by the locus data and estimate a position coordinate on the road section corresponding to position coordinates for points indicated by the locus data. The bias error estimation means can calculate an error between a position coordinate indicated by the locus data and a position coordinate on the estimated road section corresponding to the position coordinate for each of the position coordinates for points indicated by the locus data and estimate an average of the calculated errors at the points as the bias error.

A bias error changes more slowly than a random error in terms of the time. In a short time period, a position coordinate of the GPS receiver is measured with deviation of a given distance in a given direction from the true position coordinate due to an influence of the bias error. To accurately estimate the bias error, points on the road section are configured so that the positional relation between points indicated by the locus data matches a pattern. The bias error is estimated from an average of errors in the position coordinate indicated by the locus data at each point and the position coordinate on the road.

The bias error estimation means may calculate a simple average of errors at the points as an estimate value for the bias error. The bias error estimation means may also calculate a weighting average of errors at the points as an estimate value for the bias error.

To find a weighting average as an estimate value for the bias error, the bias error estimation means may be constructed to calculate the weighting average by assigning a larger weight to an error in an area more recently positioned by the GPS receiver. The bias error can be accurately estimated in proper accordance with changes in the ionization layer (chronological changes of bias errors).

The road estimation means may be constructed to use a bias error already estimated by the bias error estimation means and estimates a road section traveled by the GPS receiver during the past specified period. A position coordinate acquired from the GPS receiver obviously contains a bias error. The position correction apparatus can estimate a road traveled by the GPS receiver by correcting a position coordinate acquired from the GPS receiver using a bias error estimated by the bias error estimation means. In this manner, the position correction apparatus can more accurately estimate a road section traveled by the GPS receiver. As a result, the position correction apparatus can accurately detect the bias error.

The road estimation means can be constructed to correct a position coordinate indicated by the locus data based on a bias error already estimated by the bias error estimation means, retrieve a road highly correlated with a distribution of points indicated by the locus data based on the corrected position coordinate, and estimate a road section traveled by the GPS receiver on the retrieved road during the past specified period.

The road estimation means can be constructed to correct a position coordinate for a specific point out of position coordinates for points indicated by the locus data based on bias error already estimated by the bias error estimation means, retrieve a road nearest to the corrected position coordinate, estimate the retrieved nearest road to be the road traveled by the GPS receiver, and estimate a road section traveled by the GPS receiver on the road during the past specified period.

This technique can simply and accurately estimate the road section traveled by the GPS receiver.

The following method of estimating a road section is available. The method corrects a position coordinate for a specific point out of position coordinates for points indicated by the locus data based on a bias error already estimated by the bias error estimation means. The method defines a point nearest from the corrected position coordinate on the road as a reference point. The method estimates a position coordinate on the road corresponding to the position coordinate indicated by the locus data at each point so that a distance (road length) along the road from the reference point matches a distance (road length) along a travel locus indicated by the locus data from a specific point. The method estimates the position coordinate on the road corresponding to the position coordinate indicated by the locus data. The method estimates a section between the estimated position coordinates at both ends of the road to be the road section.

The position correction apparatus may be constructed to be capable of allowing the bias error estimation means to stop estimating a bias error based on the locus data when a distance between the nearest road retrieved by the road estimation means and the corrected position coordinate at the specified point exceeds a specified upper bound. The correction output means may be constructed to correct a certain position coordinate, which is measured by the GPS receiver during a certain period for the bias error estimation means not to estimate a bias error, based on a bias error estimated by the bias error estimation means before the certain period. The correction output means may be further constructed to output the corrected certain position coordinate.

According to this construction, the position correction apparatus can prevent an incorrect road from being estimated as the road traveled by the GPS receiver and prevent an incorrect bias error from being estimated as a result.

When the GPS receiver is mounted in a vehicle, the position correction apparatus may be constructed to include a preprocessing unit, means for calculating a displacement magnitude that calculates a displacement magnitude based on output from an autonomous navigation sensor mounted in the vehicle, and means for correcting a position coordinate that corrects a position coordinate acquired by the position information acquisition means based on the displacement magnitude. The locus data generation means may be constructed to generate the locus data representing a plurality of points corresponding to position coordinates for the GPS receiver during the past specified period based on a position coordinate corrected by the preprocessing means.

According to this construction, the position correction apparatus can more accurately find a bias error and appropriately correct a position coordinate measured by the GPS receiver.

It will be obvious to those skilled in the art that various changes may be made in the above-described embodiments of the present invention. However, the scope of the present invention should be determined by the following claims.

What is claimed is:

1. A position correction apparatus comprising:
   means for acquiring a position coordinate measured by a GPS (Global Positioning System) receiver;
   means for storing road data indicating a position coordinate of a road that is constructed;
   means for generating locus data indicating a plurality of position coordinates of the GPS receiver during a past specified period based on position coordinates acquired by the acquiring means;
   means for estimating a road section traveled by the GPS receiver during the past specified period based on road data stored by the storing means and locus data generated by the generating means;
   means for estimating a bias error of a position coordinate measured by the GPS receiver based on a plurality of position coordinates in a road section estimated by the road section estimating means and a plurality of position coordinates indicated by the locus data; and
   means for correcting a position coordinate measured by the GPS receiver based on a bias error estimated by the bias error estimating means; and
   means for outputting the corrected position coordinate, wherein:
   the road section estimating means
      corrects a specific position coordinate out of a plurality of position coordinates indicated by the locus data based on a bias error last estimated by the bias error estimating means,
      retrieves a road nearest to the corrected specific position coordinate based on the corrected specific position coordinate, and
      estimates a road section traveled by the GPS receiver on the retrieved nearest road during the past specified period;
   the bias error estimating means stops estimating a bias error based on the locus data when a distance between (i) the nearest road retrieved by the road section estimating means and (ii) the corrected specific position coordinate exceeds a specified upper bound; and
   during a non-estimate period, for which the bias error estimating means does not estimate a bias error, the correcting means correct a first position coordinate, which is measured by the GPS receiver, based on a bias error that is estimated before the non-estimate period by the bias error estimating means, and the outputting means then output the first corrected position coordinate.

2. The position correction apparatus according to claim 1, wherein:
   the GPS receiver is mounted in a vehicle;
   the position correction apparatus further comprises
      means for calculating a displacement magnitude based on output from an autonomous navigation sensor mounted in the vehicle, and
      means for correcting a position coordinate acquired by the acquiring means based on the displacement magnitude; and
   the generating means generates, based on position coordinates corrected by the calculating means and the means for correcting the position coordinate acquired by the acquiring means, the locus data indicating the plurality of position coordinates of the GPS receiver during the past specified period.

3. The position correction apparatus according to claim 1; wherein:
   the road section estimating means estimates a position coordinate on the road section corresponding to each of a plurality of position coordinates indicated by the locus data; and
   the bias error estimating means
      calculates an error between each of the plurality of position coordinates indicated by the locus data and a position coordinate on the estimated road section corresponding to the each of the plurality of position coordinates indicated by the locus data, and
      estimates, as the bias error, an average of errors, which are calculated respectively with respect to the plurality of position coordinates indicated by the locus data.

4. The position correction apparatus according to claim 3, wherein:
   the GPS receiver is mounted in a vehicle;
   the position correction apparatus further comprises
   means for calculating a displacement magnitude based on output from an autonomous navigation sensor mounted in the vehicle, and
      means for correcting a position coordinate acquired by the acquiring means based on the displacement magnitude; and
   the generating means generates, based on position coordinates corrected by the calculating means and the means for correcting the position coordinate acquired by the acquiring means, the locus data indicating the plurality of position coordinates of the GPS receiver during the past specified period.

5. The position correction apparatus according to claim 3, wherein
   the bias error estimating means
      calculates a weighting average of errors at the position coordinates by assigning a larger weight to an error relative to a position coordinate in an area where the GPS receiver is positioned more recently, and
      estimates the weighting average as the bias error.

6. The position correction apparatus according to claim 5, wherein:
   the GPS receiver is mounted in a vehicle;
   the position correction apparatus further comprises means for calculating a displacement magnitude based on output from an autonomous navigation sensor mounted in the vehicle, and means for correcting a position coordinate acquired by the acquiring means based on the displacement magnitude; and the generating means generates, based on position coordinates corrected by the calculating means and the means for correcting the position coordinate acquired by the acquiring means, the locus data indicating the plurality of position coordinates of the GPS receiver during the past specified period.

7. A position correction apparatus comprising:

an acquiring unit acquiring a position coordinate measured by a GPS (Global Positioning System) receiver;

a storing unit storing road data indicating a position coordinate of a road that is constructed;

a generating unit generating locus data indicating a plurality of position coordinates of the GPS receiver during a past specified period based on position coordinates acquired by the acquiring unit;

a first estimating unit estimating a road section traveled by the GPS receiver during the past specified period based on road data stored by the storing unit and locus data generated by the generating unit;

a second estimating unit estimating a bias error of a position coordinate measured by the GPS receiver based on a plurality of position coordinates in a road section estimated by the first estimating unit and a plurality of position coordinates indicated by the locus data; and a first correcting unit correcting a position coordinate measured by the GPS receiver based on a bias error estimated by the second estimating unit; and an outputting unit outputting the corrected position coordinate, wherein:

the first estimating unit corrects a specific position coordinate out of a plurality of position coordinates indicated by the locus data based on a bias error last estimated by the second estimating unit, retrieves a road nearest to the corrected specific position coordinate based on the corrected specific position coordinate, and estimates a road section traveled by the GPS receiver on the retrieved nearest road during the past specified period;

the second estimating unit stops estimating a bias error based on the locus data when a distance between (i) the nearest road retrieved by the first estimating unit and (ii) the corrected specific position coordinate exceeds a specified upper bound, and during a non-estimate period, for which the second estimating unit does not estimate a bias error, the first correcting unit correct a first position coordinate, which is measured by the GPS receiver, based on a bias error that is estimated before the non-estimate period by the second estimating unit, and the outputting unit then output the first corrected position coordinate.

8. The position correction apparatus according to claim 7, wherein:

the GPS receiver is mounted in a vehicle;

the position correction apparatus further comprises a calculating unit calculating a displacement magnitude based on output from an autonomous navigation sensor mounted in the vehicle, and a second correcting unit correcting a position coordinate acquired by the acquiring unit based on the displacement magnitude; and the generating unit generates, based on position coordinates corrected by the calculating unit and the second correcting unit, the locus data indicating the plurality of position coordinates of the GPS receiver during the past specified period.

9. The position correction apparatus according to claim 7, wherein:

the first estimating unit estimates a position coordinate on the road section corresponding to each of a plurality of position coordinates indicated by the locus data; and the second estimating unit calculates an error between each of the plurality of position coordinates indicated by the locus data and a position coordinate on the estimated road section corresponding to the each of the plurality of position coordinates indicated by the locus data, and estimates, as the bias error, an average of errors, which are calculated respectively with respect to the plurality of position coordinates indicated by the locus data.

10. The position correction apparatus according to claim 9, wherein:

the GPS receiver is mounted in a vehicle;

the position correction apparatus further comprises a calculating unit calculating a displacement magnitude based on output from an autonomous navigation sensor mounted in the vehicle, and a second correcting unit correcting a position coordinate acquired by the acquiring unit based on the displacement magnitude; and the generating unit generates, based on position coordinates corrected by the calculating unit and the second correcting unit, the locus data indicating the plurality of position coordinates of the GPS receiver during the past specified period.

11. The position correction apparatus according to claim 9, wherein the second estimating unit calculates a weighting average of errors at the position coordinates by assigning a larger weight to an error relative to a position coordinate in an area where the GPS receiver is positioned more recently, and estimates the weighting average as the bias error.

12. The position correction apparatus according to claim 11, wherein:

the GPS receiver is mounted in a vehicle;

the position correction apparatus further comprises a calculating unit calculating a displacement magnitude based on output from an autonomous navigation sensor mounted in the vehicle, and a second correcting unit correcting a position coordinate acquired by the acquiring unit based on the displacement magnitude; and the generating unit generates, based on position coordinates corrected by the calculating unit and the second correcting unit, the locus data indicating the plurality of position coordinates of the GPS receiver during the past specified period.

* * * * *